United States Patent [19]

Formán et al.

[11] 4,177,293

[45] Dec. 4, 1979

[54] PROCESS OF MANUFACTURE OF A BUTTER SPREAD

[75] Inventors: Ladislav Formán; Zdének Pech, both of Prague; Vaclśv Vondrúska, Liberec, all of Czechoslovakia

[73] Assignee: Mlekarensky prumysl, generalni reditelstvi, Prague, Czechoslovakia

[21] Appl. No.: 960,787

[22] Filed: Nov. 15, 1978

[51] Int. Cl.² ............................................. A23C 9/12
[52] U.S. Cl. ....................................... 426/43; 426/42
[58] Field of Search ................... 426/42, 40, 43, 603

[56] References Cited

U.S. PATENT DOCUMENTS

| | | | |
|---|---|---|---|
| 2,009,136 | 7/1935 | Grelck | 426/40 |
| 2,719,793 | 10/1955 | Page et al. | 426/43 |
| 3,235,387 | 2/1966 | Stumbo et al. | 426/43 |
| 3,962,464 | 6/1976 | Sozzi | 426/43 |

*Primary Examiner*—Jeanette M. Hunter

[57] ABSTRACT

This invention relates to the manufacture of butter-spread, which when compared with butter contains a substantially lower fat content, i.e. between about 19–48%, and increased protein content of between about 4.6 to 7.7%. The manufacturing process starts from cream, possibly from a mixture of cream and vegetable oil which is enriched by the addition of dried milk or protein concentrate. The mixture is pasteurized, homogenized, and fermented by clean milk cultures. By repeated homogenization and addition of a stabilizer, a consistency similar to butter with very good spreading characteristics even at refrigerated temperatures is achieved. The product is durable and has acceptable shelf life even without the addition of preservers.

13 Claims, No Drawings

PROCESS OF MANUFACTURE OF A BUTTER SPREAD

BACKGROUND OF THE INVENTION

The instant invention relates to a process for manufacturing a butter-spread using simple means to obtain a highly useful product. Butter-spreads with low fat content, known as low caloric or semibutter have been manufactured by prior art methods. However, the techniques employed herefore were rather demanding in the production of such butter modifications due to the high water content in such compositions. Additionally, prior art products required that the preservatives be added in order to achieve useful storage or shelf life characteristics.

SUMMARY OF THE INVENTION

According to this invention, sweet cream, admixed with skim milk and/or protein concentrates is pasteurized, innoculated with a suitable milk culture and submitted to a first homogenization step at a temperature of between 20° to about 30° C. and under pressure between about 25 to 10 MPa. Thereafter, the first homogenized product is permitted to mature until it has a Dornic acidity of between 68 to 112 degrees. The acidified composition is stabilized with from about 0.1 to about 5% by weight of a food stuff water stabilizer and is heated to a temperature of between about 65 to about 80° C. and is then submitted to a second homogenization step at a pressure of 5 MPa. Thereafter, it may be packed in suitable containers or packages and cooled to a temperature of from about 3°–10° C. It can be flavored by the addition of flavor and aromatic ingredients as are known in the art. It is also possible to add vegetable oils to the sweet cream up to a fat content of 50% by weight.

The process according to our invention represents new technology, which is simple, time saving, and uses easily obtainable stabilizers. The resulting product is nutritiously advantageous due to its low caloric content, having reduced fat content and containing desirable amounts of proteins. The butter-spread further has a smooth, fine consistency which makes it easily spreadable even at refrigerator temperatures. It has an agreable and delicious taste and possesses acceptable durability or shelflife even without the addition of presevatives.

By the term "suitable milk cultures" we mean all starters usually used for ripening cream in production of conventional butter.

Milk cultures which may be employed according to this invention include following strains: Streptococcus lactis, Streptococcus cremoris, Streptococcus diacetilactis or Streptococcus citrovorum and dextranicum.

Foodstuff water stabilizers, useful in the instant process include such materials as for example modified starch, gelatine, pectin, bean loscungum et c.

Suitable protein concentrates include for example Na- caseinat, milk protein, coprecipitate.

Vegetable oils which may be employed include sunflower oil and other products as soya bean oil, palm oil, olive oil, peanut oil at c.

The maximum temperature is 30° C. When a higher temperature than 30° C. is used, the quality of the emulsion is not suitable for the proper consistency of the final product.

On the other way, an elevated homogenizing pressure is necessery for obtaining a good consistency of the final product.

The time limit for maturation depends on attaining the acidity level. But the time limit may be influenced by the quantity of starter added for inoculation and by the ripening temperature.

For the first homogenization may be used any homogenizator breaking up milk globules by forcing the milk under high pressure through small openings against a hard wall. The second homogenization is performed by a homogenizator of the same type or by any suitable mixer.

DESCRIPTION OF THE INVENTION

According to a preferred embodiment of the instant process we prepare a mixture of sweet cream having a fat content of about 20 -about 50% by weight and 2–10% by weight of dried skim milk. This mixture is pasteurized and cooled to 20–30 degrees C. It is then inoculated with from about 0.1 to 5% of weight of a suitable milk culture of the type aformentioned and subjected to a first homogenization treatment at pressures from 10 to 25 MPa. A change in the emulsified condition of the mixture is obtained, and the consistency of the product is favorably influenced. The mixture is permitted to mature up to an acidity of 68°–112° D. Thereafter, 0.1 to 5% by weight of a food stuff water stabilizer, being one of those heretofore mentioned is added to the acidified cream mixture and after stirring, the mixture is heated to 65° to 80° C. while being continuously stirred. At this temperature the mixture is subjected to second homogenization step at a pressure of about 5 MPa in order to obtain a fine consistency of the product. The homogenized product is packaged and permitted to stand at temperatures of 3°–10° C. Within a short period of time, as for example about 24 hours, the product can be used or shipped.

The following examples are submitted in order to demonstrate preparation of butter-spread composition according to the instant invention. These are illustrative only and various modifications with respect to the constituents, their ranges, homogenization temperatures and pressures, and treatment times may be made as will be apparent to those familiar with this art.

EXAMPLE I

Cream having a fat content of 40% by weight was mixed with 6% by weight of dried skim milk. This mixture was pasteurized and cooled to 25° C. Thereafter, it was inoculated with 0.5% by weight of a cream starter being Streptococcus lactis and cremoris and homogenized at a pressure of 20 MPa. The homogenized mixture was permitted to mature until an acidity degree of 68° D was obtained. To the thus matured mixture, we added 1% by weight of a stabilizer, being gelatine, and 0.5% of sodium chloride. Further a small amount of food stuff dye being extract from Bixa orelana, was added in order to obtain a pleasing color shade of the resulting product. The mixture was susequently heated in an autoclave type vessel and subjected to a second homogenizing step at a temperature of 75° C. and a pressure of 5 MPa. During the homogenization step the mixture was subjected to intensive but smooth stirring. Thereafter, the product was permitted to cool and was suitable for consumption the following day. The product of this example contained 40% of dry substance. The dry substance contained 35% of milk fat, 3.8% protein, 6% saccharides, 1.2% ash, and showed an active acidity of about 4.5 pH.

EXAMPLE 2

Cream having a fat content of 20% was mixed with 8% of solidified skim milk. The mixture was then pasteurized, cooled, cultured and processed as described in example 1. The final product contained about 16% of fat and 31% of dry milk solids.

EXAMPLE 3

Cream having a fat content of 25% by weight was mixed with 5% of a protein concentrate /namely Na-caseinat/. This mixture was then pasteurized and subsequently processed through two hogenizing steps as described in example 1. The final product contained 36% of dry substance of which 7.6% were proteins, 23.7% fat and 4.8 saccharids. This product has a nutritionally acceptable ratio of fat to proteins.

EXAMPLE 4

Cream which had a fat content of 50% had been thickened by the addition of solidified skim milk was pasteurized and cooled to a temperature of 23° C. The cooled mixture was innoculated with 1% of a cream starter /Streptococcus lactis/, and homogenized at a pressure of 22 MPa. The homogenized mixture was permitted to mature until an acidity of 70° D was achieved. Thereafter, 1% by weight of a stabilizer, being modified maize starch, was added. In this example, flavoring ingredients were subsequently added, namely on the basis of 100 kg of the mixture, 0.02 kg of dried parsley, 0.1 kg of dill, 3 kg of chopped onion and 3 kg of red peppper were added. The mixture containing the flavor ingredients was heated to 70° C. and then homogenized again at a pressure of 5 MPa. It was cooled, packaged, and permitted to stand for a period of approximately 24 hours before use. It should be mentioned that the flavoring ingredients might also be added to the product after the second homogenizing step and prior to packing.

EXAMPLE 5

Cream having a fat content of 30% by weight was mixed with 16% by weight of sunflower oil and further enriched by the addition of 6% by weight of dried skim milk. The mixture was then pasteurized and cooled to 27° C. and thereafter innoculated with 2% by weight of a cream milk culture, being *Streptococcus diacetilactis* mixed with *Streptococcus cremoris*. The mixture was then subjected to a first homogenizing treatement at a pressure of 15 MPa and permitted to mature until an acidity degree of 80° D was noted. 2% by weight of a water stabilizer on a starch base /partly hydrolysed starch/ was thereafter added. The mixture was then heated, while being continuously stirred, to 73° C. and homogenized for a second time. The product was then cooled to 10° C. and subsequently packaged. The final product contained about 8% of linoleic acid.

The foregoing description and examples are exemplary and are not considered limiting of the invention. Various modifications may be made as will be apparent to those skilled in this art.

What is claimed:

1. Process for the manufacture of a butter-spread comprising the steps of forming a mixture of sweet cream and a thickening agent selected from the group consisting of dried milk, protein concentrates and mixtures thereof, pasteurizing said mixture, cooling the pasteurized mixture, adding a clean milk culture, submitting the cooled mixture to a first homogenizing step at temperatures between about 20° C. and 30° C. and pressures between about 10 to 25 MPa, and maturing the mixture until it is acidified to a degree between about 68° to 112° Dornic, adding a foodstuff water stabilizer in amount between about 0.5 to 5% by weight, submitting the mixture to a second homogenizing step at temperatures between about 65° C. and 80° C. and at a pressure of about 5 MPa, cooling the second homogenized mixture to at least about 10° C. to further cure the butterspread.

2. Process according to claim 1, wherein said thickening agent is dried skim milk.

3. Process according to claim 1, wherein said thickening agent is a protein concentrate.

4. Process according to claim 1, wherein flavor and aromatic materials are added prior to the second homogenization step.

5. Process according to claim 1, wherein the fat content of the butter-spread is increased by adding vegetable oil up to an overall fat content of about b 50% by weight.

6. Process according to claim, wherein said clean milk culture is *Streptococcus lactis.*

7. Proess according to claim 1, wherein said clean milk culture is *Streptococcus diacetilactis.*

8. Process according to claim 1, wherein said clean milk culture is *Streptococcus cremoris.*

9. Process according to claim 1, wherein said clean milk culture is *Streptococcus citrovorum* and *dextranicum.*

10. Process aggording to claim 1, wherein said foodstuff water stabilizer ist modified starch.

11. Process according to claim 1, wherein said foodstuff water stabilizer ist gelatine.

12. Process according to claim 1, wherein said foodstuff water stabilizer is pectin.

13. Process according to claim 1, wherein the second homogenized mixture is cooled to between 3° C. and 10° C. to further cure the butter-spread.

* * * * *